No. 816,798. PATENTED APR. 3, 1906.
W. HOULDSWORTH.
ROLLER BEARING.
APPLICATION FILED MAR. 7, 1905.
2 SHEETS—SHEET 1.
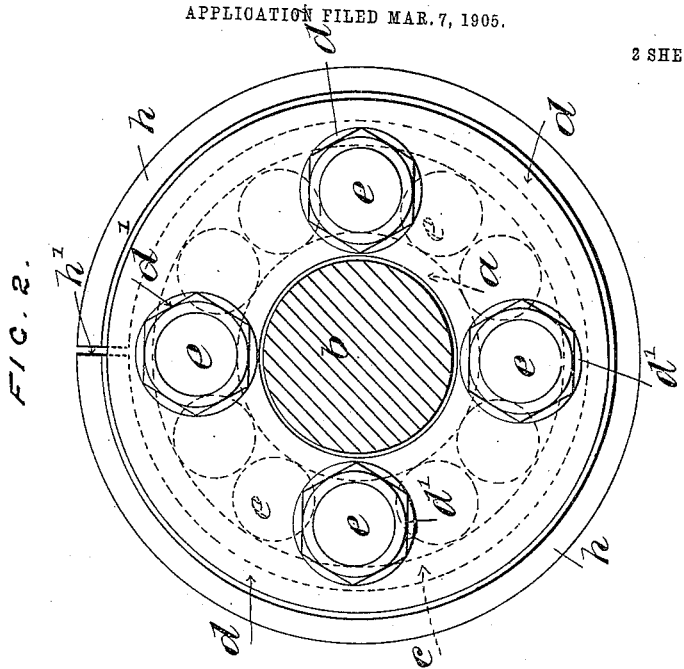
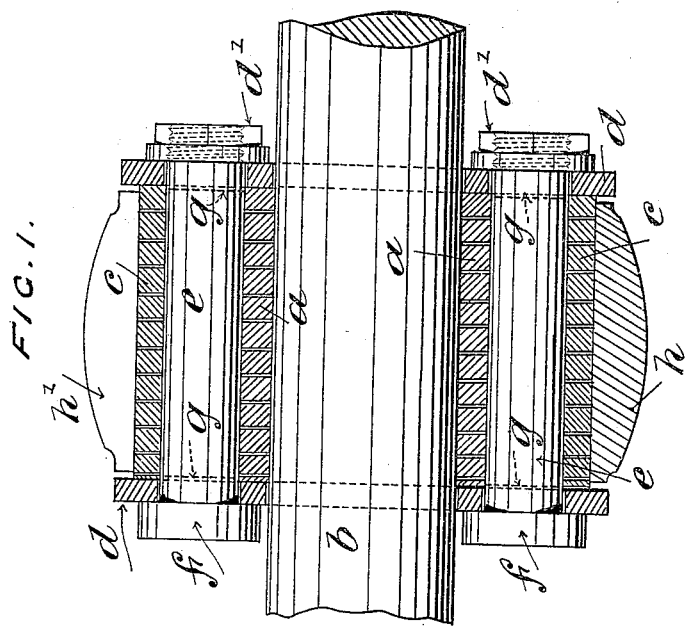
WITNESSES.
INVENTOR.
William Houldsworth
By his Attorneys No. 816,798. PATENTED APR. 3, 1906.
W. HOULDSWORTH.
ROLLER BEARING.
APPLICATION FILED MAR. 7, 1905.
2 SHEETS—SHEET 2.
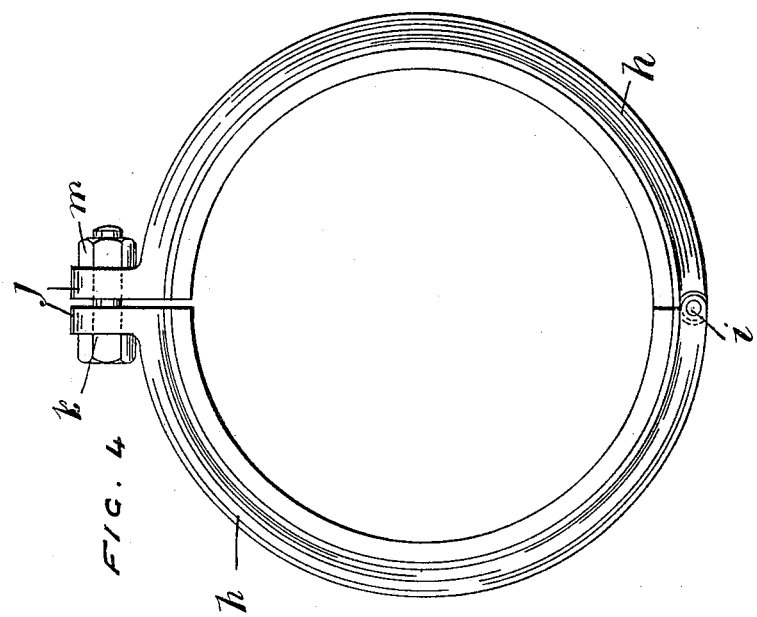
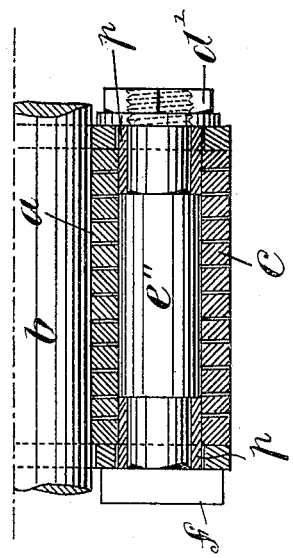

UNITED STATES PATENT OFFICE.

WILLIAM HOULDSWORTH, OF MANCHESTER, ENGLAND.

ROLLER-BEARING.

No. 816,798.  Specification of Letters Patent.  Patented April 3, 1906.

Application filed March 7, 1905. Serial No. 248,819.

*To all whom it may concern:*

Be it known that I, WILLIAM HOULDSWORTH, engineer, a subject of the King of Great Britain, residing at 67 Seedley road, Pendleton, Manchester, in the county of Lancaster, England, have invented new and useful Improvements in Roller-Bearings, of which the following is a specification.

My invention has reference to roller-bearings of the type in which is employed a ring or collar which is placed upon the shaft or axle and an outer ring or shell of larger diameter, the concentric annular space between the ring and shell being filled with rollers. The rollers are maintained in position and guided in the race by means of end collars on each alternate roller, such collars bearing against the ends of the intermediate rollers and the two rings or shells which provide the roller-race. In practice I find there are difficulties in taking up the wear caused by friction of the collars and the rings providing the roller-race.

The chief object of my invention is to construct a roller-bearing of the type indicated whereby a yielding expansive force obtained through the aid of a spring or springs is brought to act upon the collars so as to automatically compensate for wear.

I will describe my invention in detail with reference to the accompanying two sheets of drawings, in which—

Figure 1 shows in sectional elevation a bearing constructed in accordance with my invention. Fig. 2 is a face view thereof. Fig. 3 shows a modified construction of roller which can be used under my invention. Fig. 4 shows a modified construction of a detail part of my invention.

In Figs. 1 and 2 of the drawings the ring $a$, which is slipped upon the shaft or axle $b$, and the outer shell or ring $c$ are made out of stout wire or rod of steel square, or practically so, in cross-section, which has been wound in a spiral upon a mandrel of the requisite size, the ends being straightened off.

The tubular spirals $a$ $c$ are hardened to the required degree. I find this is an economical method of obtaining the rings for the roller-race. The spiral rings $a$ $c$ are compressed between end washers $d$ $d$ by means of the removable collars $d'$ when the rollers $e$ have been placed in position. To effect this, the washers $d$ are bored out or perforated to pass the ends of each alternate roller or any desired number, (shown four out of twelve in Fig. 2,) the collars $d'$ being then screwed or otherwise secured on the rollers to compress the washers $d$ $d$ between them and the collars $f$ at the other ends of the rollers, and so put the spiral rings $a$ $c$ in compression. The holes in the washers $d$ are made so as to allow the roller ends to rotate freely. The spiral rings $a$ $c$ being thus under compression react upon the washers $d$ and the collars $d'$ and $f$, serving to prevent the collars $d'$ becoming loose when subject to vibration, jars, and shocks and also the important office of automatically compensating for wear of the parts. Moreover, the spiral rings $a$ $c$ are free also to yield or be further compressed when any strain tending in that direction is brought to bear, and thus greatly relieve the strain upon the collars of the rollers. To obtain the further compression of the spiral rings $a$ $c$, the rollers, formed plain or without collars, are made rather less in length than the normal width space between the washers, as shown by the dotted lines marked $g$ in Fig. 1. In some cases I provide means for compressing the outer spiral ring $c$ in diameter to some extent, so as to adjust the annular space between the rings $a$ and $c$ to compensate for wear or when such space is found to be too large. This is effected by means of a ring $h$, cut at $h'$, Fig. 2, and forced or expanded over the outer spiral ring $c$, or, as shown in Fig. 4, the ring may be hinged at the bottom $i$ and provided with bored-out snugs $j$, whereby the ring may be clamped or compressed upon the spiral ring $c$ by a bolt $k$ and nut $m$. The effect of such compression would be to reduce slightly the diameter of the spiral ring $c$, lessening the width of the annular roller-space between the rings $a$ and $c$ and bringing all the rollers up to their work. The outer ring $h$ may be formed with a curved or spherical surface, as shown in Fig. 1, to rest upon a corresponding or suitable bed, so that the bearing would be free to rock to some extent to accommodate itself to inequalities of alinement or irregular running of the shaft.

In some cases the outer ring $h$ may be dispensed with, as where the roller-bearing is disposed within a cylindrical recess prepared to receive it. Such cylindrical recess could be made small enough to give the desired compression upon the outer spiral ring $c$.

I do not confine myself to the use of spiral rings in place of the usual cylindrical rings of metal. I find also that an advantage in reducing friction upon the rollers e may be obtained by constructing them with a loose sleeve at each end of the roller, as shown in the sectional view, Fig. 3. The roller e'' is reduced at each end, and a sleeve p of equal diameter to the roller is disposed on the reduced end, capable of rotating freely thereon.

By the use of the end washers d and the springs, as described, besides the advantage of obtaining automatic compensation for wear I find that the rollers with end collars being put under tension the strain serves to induce them to run in a truer line coinciding with the axis of the shaft or axle, and necessarily they also correspondingly influence the intermediate collarless rollers. Thus I am enabled to use rollers of a smaller diameter relative to their length than I should otherwise be able to do.

I declare that what I claim is—

1. A roller-bearing for shafts or axles consisting of a ring or sleeve for the shaft or axle, an outer shell of larger diameter, a ring of rollers arranged in the space between such sleeve and shell, a washer arranged at each end of the sleeve and shell which form the roller-race, a portion of the rollers passing loosely through the washers, collars on such projecting rollers bearing against the washers and by means of which the washers can be brought into contact with the ends of the sleeve and shell forming the roller-race substantially as described.

2. The roller-bearing for shafts or axles consisting of a spirally-formed sleeve for the shaft or axle, an outer spiral ring of larger diameter, a washer arranged at each end of the spiral rings, rollers contacting with each other and filling up the annular space formed between the spiral rings a portion of such rollers passing loosely through the end washers, collars on such rollers bearing against the washers by means of which the spiral rings are put in compression substantially as described.

3. The roller-bearing consisting of a spirally-formed sleeve for the shaft or axle, an outer spiral ring of larger diameter, a washer arranged at each end of such spiral rings, rollers filling up the annular space formed between the spiral rings, a number of such rollers passing loosely through the end washers, collars on such projecting rollers bearing against the washers by means of which the spiral rings are put in compression, and a sleeve compressed upon the outer spiral ring to maintain the rollers in contact throughout with the spiral rings substantially as described.

4. The roller-bearing consisting of a spirally-formed sleeve for the shaft or axle, an outer spiral ring of larger diameter, a washer arranged at each end of such spiral rings, rollers filling up the space between the spiral rings, a number of such rollers passing loosely through the end washers, collars on such projecting rollers bearing against the washers by means of which the spiral rings are put in compression, loose sleeves arranged on the ends of the rollers, and a sleeve compressed upon the outer spiral ring to maintain the rollers in contact with the spiral rings and a curved or spherical surface formed on the sleeve substantially as described.

5. A roller for roller-bearings consisting of a central portion of requisite diameter, said roller having reduced ends, and sleeves mounted rotatably on such reduced ends to form a roller of the requisite diameter throughout substantially as described.

In testimony whereof I have signed my name to this specification in the presence of two subscribing witnesses.

WILLIAM HOULDSWORTH.

Witnesses:
JOSHUA ENTWISLE,
ALFRED YATES.